(No Model.)
C. A. FAAS.
BRACELET.
No. 255,610. Patented Mar. 28, 1882.
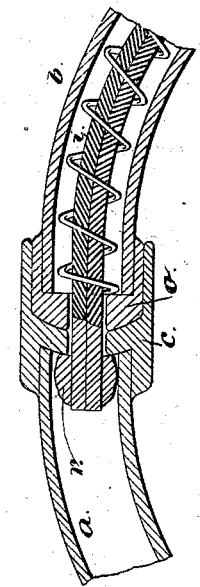
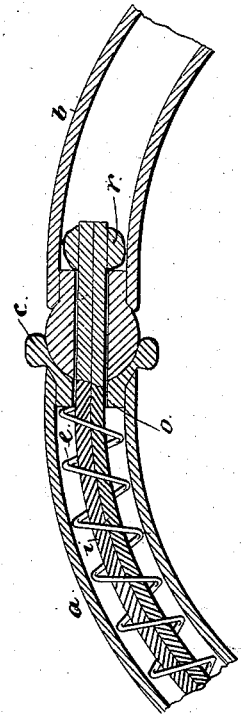
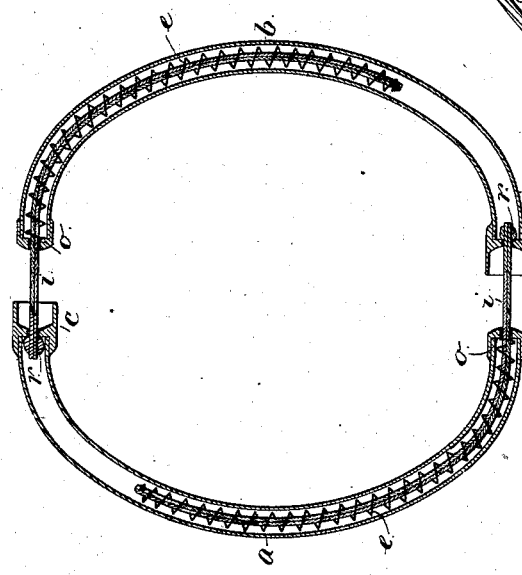

UNITED STATES PATENT OFFICE.

CHARLES A. FAAS, OF BROOKLYN, ASSIGNOR TO HIMSELF AND GEORGE A. EATON, OF NEW YORK, N. Y.

BRACELET.

SPECIFICATION forming part of Letters Patent No. 255,610, dated March 28, 1882.

Application filed January 30, 1882. (No model.)

*To all whom it may concern:*

Be it known that I, CHARLES A. FAAS, of Brooklyn, in the county of Kings and State of New York, have invented an Improvement in Bracelets, of which the following is a specification.

Letters Patent No. 240,924, granted May 3, 1881, to M. Pollak, show a bracelet made in two parts hinged together, and having a spring that acts to draw the moving ends together.

The present invention is an improvement upon the same, and relates to a bracelet made in two or more sections with slip-joints at the ends, in combination with springs that act to draw the sections together, but which springs allow the sections to be separated as the bracelet is expanded for passing the same over the hand. This improvement dispenses with hinged joints and also allows the bracelet to be expanded with but little compression on each spring, and the bracelet is very flexible when opened and sufficiently rigid for comfort when closed around the wrist.

In the drawings, Figure 1 is a section of the bracelet partially open. Fig. 2 is a section in larger size of one of the coupling-connections, and Fig. 3 is a section of a flexible connection.

The bracelet is of any desired size, pattern, or material. It is hollow, so as to be adapted to receive one or more springs.

The parts or sections $a$ and $b$ are represented in Fig. 1 as of equal size and similar construction. Each section has at one end a coupling, $c$, adapted to receive the plain end of the other section. The coupling $c$ may be a cylindrical tube or a flat tube, and the end of the other section that enters the coupling should be slightly rounded, so as to pass in freely, and it is to fit the coupling sufficiently tight to make the bracelet firm when the sections are drawn together around the wrist.

In some instances it is desirable to make the bracelet yielding. For effecting this the ends of one section may be rounding, as seen in Fig. 3, to pass into the cup-shaped ends on the other section. The sections are connected together by flexible wires or by chains $i$, passing from one section into the other and through the helical springs $e$. There are abutments $o$ for the ends of the springs to rest against, and these are soldered or otherwise fastened into the sections of the bracelets, as represented in the before-named patent.

There may be a spring at each end of the wire or chain $i$, so as to act upon the two parts $a$ $b$ and force their ends together; or one end of the chain or wire may be soldered in one section, as shown at $r$, and the chain or wire pass through the abutment $o$ in the other part and through the helical spring to the distant end, where the spring is soldered or otherwise attached to the wire. By this construction the bracelet can be expanded sufficiently to allow the same to be passed over the hand, and then the springs will draw the sections together around the wrist, and such bracelet will be more or less rigid, according to the manner in which the ends of the respective sections are made.

In some instances the bracelet will be in the form of a coiled tube, the ends lapping past each other and fastened together. In this case the springs can be in the section composed of the ends of the tubular coil.

The bracelet may have several sections or tubular ornaments threaded upon the wire or chain, the spring or springs being in one of the tubular sections that is of sufficient length to receive the same.

I do not claim a bracelet made in two or more sections with spring-wires passing from one section into or through the other, as this has been made use of.

I claim as my invention—

1. The combination, in a bracelet, of two or more hollow sections, chains or wires passing from one section into the other at both ends of the sections, and helical springs within the sections, through which the wires or chains pass, and to which they are attached at the inner ends, as set forth.

2. The combination, in a bracelet, of two or more sections, couplings at the respective ends of the sections, springs within the sections, a wire or chain passing from one section into the other at each end of the section, and abutments for the ends of the springs, through which abutments and springs the wires or chains pass and are attached, substantially as set forth.

Signed by me this 25th day of January, A. D. 1882.

CHAS. A. FAAS.

Witnesses:
GEO. T. PINCKNEY,
CHAS. H. SMITH.